United States Patent
Mhatre

(10) Patent No.: US 9,430,779 B1
(45) Date of Patent: Aug. 30, 2016

(54) DETERMINING VISUAL ATTRIBUTES OF CONTENT ITEMS

(75) Inventor: Amit Mhatre, Mountain View, CA (US)

(73) Assignee: Google Inc., Mountain View, CA (US)

( * ) Notice: Subject to any disclaimer, the term of this patent is extended or adjusted under 35 U.S.C. 154(b) by 310 days.

(21) Appl. No.: 13/559,393

(22) Filed: Jul. 26, 2012

(51) Int. Cl.
*G06Q 30/00* (2012.01)
*G06Q 30/02* (2012.01)

(52) U.S. Cl.
CPC .................................. *G06Q 30/0251* (2013.01)

(58) Field of Classification Search
CPC ....................... G06Q 30/0241; G06Q 30/0251
USPC ............................................................ 705/14
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,039,599 B2 | 5/2006 | Merriman |
| 7,127,473 B2 * | 10/2006 | Agassi et al. |
| 7,136,875 B2 | 11/2006 | Anderson et al. |
| 7,440,674 B2 | 10/2008 | Plotnick et al. |
| 7,757,254 B2 * | 7/2010 | Shoff et al. ..................... 725/44 |
| 7,953,631 B1 * | 5/2011 | Moss et al. ................ 705/14.43 |
| 8,074,882 B2 | 12/2011 | Dmitriev et al. |
| 2002/0031444 A1 * | 3/2002 | Ito et al. ......................... 422/62 |
| 2002/0194263 A1 | 12/2002 | Murren et al. |
| 2003/0212762 A1 * | 11/2003 | Barnes et al. ................ 709/219 |
| 2003/0235218 A1 * | 12/2003 | Pandit ........................... 370/522 |
| 2004/0117256 A1 | 6/2004 | Brucker et al. |
| 2004/0215559 A1 | 10/2004 | Rebenack et al. |
| 2005/0028217 A1 * | 2/2005 | Marler et al. ................. 725/112 |
| 2005/0055644 A1 * | 3/2005 | Stockton ....................... 715/766 |
| 2006/0069618 A1 | 3/2006 | Milener et al. |

(Continued)

FOREIGN PATENT DOCUMENTS

| WO | WO 97/21183 | 6/1997 |
|---|---|---|
| WO | WO 03/025696 | 3/2003 |

OTHER PUBLICATIONS

U.S. Appl. No. 95/001,073 Reexamination of Stone et al.

(Continued)

*Primary Examiner* — Matthew L Hamilton
(74) *Attorney, Agent, or Firm* — Fish & Richardson P.C.

(57) ABSTRACT

Methods, systems, and apparatus for determining the visual attributes of content items are described. In one aspect, a method includes receiving a request to serve supplemental content to be presented with a page requested by a user of a client system; selecting one or more attributes randomly from a plurality of attributes for presenting the supplemental content to the user, wherein the selected one or more attributes are different than at least one previous attribute used to present one or more items of supplemental content to the user previously; and transmitting the supplemental content and the selected one or more attributes to the client system for presentation along with the requested page.

18 Claims, 4 Drawing Sheets

(56) References Cited

U.S. PATENT DOCUMENTS

| | | | |
|---|---|---|---|
| 2006/0149622 A1 | 7/2006 | Baluja et al. | |
| 2006/0184579 A1* | 8/2006 | Mills et al. | 707/104.1 |
| 2007/0192164 A1 | 8/2007 | Nong et al. | |
| 2008/0040768 A1* | 2/2008 | Robotham | 725/132 |
| 2008/0126475 A1* | 5/2008 | Morris | 709/203 |
| 2009/0064236 A1* | 3/2009 | Lee et al. | 725/62 |
| 2009/0099934 A1 | 4/2009 | Lee et al. | |
| 2009/0187465 A1* | 7/2009 | Leggetter et al. | 705/10 |
| 2010/0049606 A1* | 2/2010 | Trzybinski et al. | 705/14.53 |
| 2010/0070529 A1* | 3/2010 | Gokturk et al. | 707/780 |
| 2010/0125884 A1* | 5/2010 | Howcroft | 725/93 |
| 2010/0192055 A1* | 7/2010 | Shaked et al. | 715/234 |
| 2010/0269138 A1* | 10/2010 | Krikorian et al. | 725/39 |
| 2011/0072374 A1 | 3/2011 | Kunz et al. | |
| 2011/0307339 A1* | 12/2011 | Russell et al. | 705/14.66 |
| 2012/0072228 A1* | 3/2012 | Pankajakshan et al. | 705/1.1 |
| 2013/0036007 A1* | 2/2013 | Lau et al. | 705/14.49 |
| 2013/0071090 A1* | 3/2013 | Berkowitz et al. | 386/248 |
| 2013/0275547 A1* | 10/2013 | Chew et al. | 709/217 |
| 2014/0033007 A1* | 1/2014 | Mhatre | 715/205 |

OTHER PUBLICATIONS

U.S. Appl. No. 95/001,061 Reexamination of Stone et al.
U.S. Appl. No. 95/001,069 Reexamination of Dean et al.
U.S. Appl. No. 95/001,068 Reexamination of Stone et al.
U.S. Appl. No. 11/558,091 filed Nov. 9, 2006, Hochberg et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Dedrick, R., A Consumption Model for Targeted Electronic Advertising, Intel Architecture Labs, IEEE, 1995.
Dedrick, R., Interactive Electronic Advertising, IEEE, 1994.
Information Access Technologies, Inc., Aaddzz brochure, "The Best Way to Buy and Sell Web Advertising Space,"© 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Request for Reexamination of U.S. Patent No. 7,240,025 B2, Control No. 95/001,073.
Request for Reexamination of U.S. Patent No. 6,446,045 Bl, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

\* cited by examiner

DETERMINING VISUAL ATTRIBUTES OF CONTENT ITEMS

BACKGROUND

This specification relates to the presentation of content items.

The Internet provides access to a wide variety of resources. For example, video files, audio files, and image files, as well as web pages for particular subjects or articles, are accessible over the Internet. Access to these resources presents opportunities for other content items, such as advertisements or other supplemental content, to be provided with the resources.

Advertising is a primary technique by which providers of products or services communicate with potential purchasers in the hopes of influencing them to purchase the goods or services they are selling. Advertisements may also be used to dispense information, convey a message, or promote a cause. Advertisers generally wish to present advertisements that are pleasing and enjoyable to a viewer, as a viewer is unlikely to be positively influenced by an advertisement that is presented in a format to which the viewer is not receptive.

SUMMARY

This specification describes technologies relating to determining visual attributes for content items, such as advertisements or other supplemental content, that may be displayed in a publication, such as a web page. Visual attributes of content items may include text formatting, layout, mouseover effects, position of buttons, position of annotations, and other aspects or characteristics that affect the appearance of the content item. The visual attributes may be determined at the time the content item is requested for presentation to the user and may be selected at random. The visual attributes may be selected further based on weights assigned to the attributes, or on user activity associated with content items previously presented to the user. One or more of the attributes may be different from at least one previous attribute used to present an advertisement to the user previously.

In general, one innovative aspect of the subject matter described in this specification can be implemented in methods for determining visual attributes for content items. Methods for determining visual attributes may include receiving a request to serve supplemental content to be presented with a page requested by a user of a client system; selecting one or more attributes randomly from a plurality of attributes for presenting the supplemental content to the user, wherein the selected one or more attributes are different than at least one previous attribute used to present one or more items of supplemental content to the user previously; and transmitting the supplemental content and the selected one or more attributes to the client system for presentation along with the requested page. Other potential implementations include corresponding systems, apparatus, and computer programs, configured to perform the actions of the methods, encoded on computer storage devices.

These and other implementations can optionally include one or more of the following features. The page may include a web page provided by a publisher. The supplemental content may include an advertisement. The one or more attributes may define one or more of a font color, a font size, a font style, or a font weight. The one or more attributes may define a layout of the supplemental content. The one or more attributes defines a position of a button. Selecting one or more attributes for presenting the supplemental content to the user may include selecting the one or more attributes based on a weight assigned to each attribute of the one or more attributes. Selecting one or more attributes for presenting the supplemental content to the user may include selecting the one or more attributes based on actions of the user associated with one or more items of supplemental content that were presented to the user previously.

Particular implementations of the subject matter described in this specification may be implemented to realize one or more of the following potential advantages. A user may be presented with a content item to which the user is likely to be receptive and may enjoy receiving the content item, which may enhance the user's experience and may increase the likelihood that the user will interact with the content item. Providers of the content item may effectively attract a user's attention to the content item, which may lead to increased monetization performance of the content item.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Various implementations described in this specification are discussed below in the context of advertisements. The technologies described in this specification may be used to determine visual attributes for other content items. For example, the techniques may be used to determine visual attributes for application displays, user interfaces, or web pages. Other implementations may include components different from those described herein.

Figure 1:
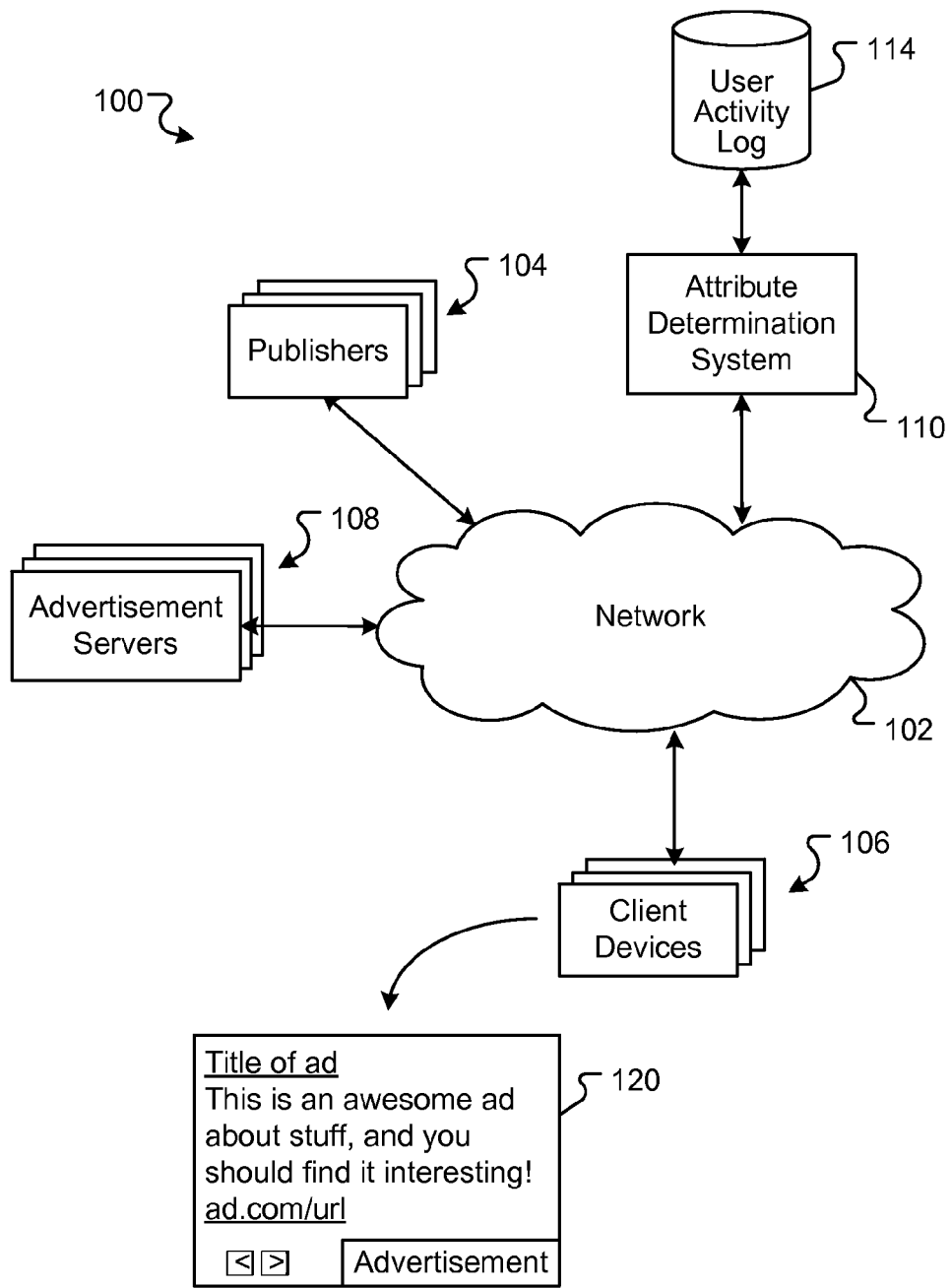
FIG. 1 is a block diagram of an example environment in which the visual attributes of a content item can be determined.

FIG. 1 is a block diagram of an example environment 100 in which the visual attributes of a content item can be determined on a per-user basis at the time the content item is requested. A network 102, such as a local area network (LAN), wide area network (WAN), the Internet, a wired network, a wireless network, or a combination thereof, connects publishers 104, client devices 106, advertisement servers 108, and an attribute determination system 110. The environment 100 may connect many thousands of publishers 104, advertisement servers 108, and client devices 106.

A client device 106 is an electronic device that is under the control of a user and is capable of requesting and receiving publications and content items over the network 102. Example client devices 106 include personal computers, mobile communication devices, and other devices that can send and receive data over network 102. A client device 106 typically includes a user application, such as a web browser, to facilitate the sending and receiving of data over the network 102. The web browser can enable a user to display and interact with text, images, videos, music, and other information typically located on a web page at a website on the World Wide Web or a local area network.

Each publisher 104 maintains one or more publications on one or more servers. A publication is any data that can be provided by the publisher 104 over the network 102. Publications can include, for example, HTML pages (e.g., web pages), word processing documents, portable document format documents, RSS feeds, video, audio, and images. A publication can include content, such as text or images, and may include embedded information, such as meta information or hyperlinks, and/or embedded instructions, such as markup language (e.g., XML, HTML, etc.), scripts (e.g., JavaScript scripts), or applets. A publisher 104 of a publication may define content item environments, such as advertisement slots or slots for other supplemental content, in which content items, such as advertisements or other supplemental content, can be presented in the publication. These content item environments can be defined in the publication or defined for presentation with the publication.

A client device 106 sends a request to a server of a publisher 104. The request is a request for a publication, such as a web page. The request may include a unique user identifier that identifies the client device 106 that submits the request. The unique user identifier can be data from a cookie stored at the client device 106, a user account identifier if the user maintains an account with the publisher 104, or some other identifier that identifies the client device 106 or the user using the client device 106. In response to receiving a request with a user identifier, the publisher server 104 may provide the user identifier to the attribute determination system 110.

In some implementations, the user identifier is anonymized so that the user cannot be personally identified and thereby protect user privacy. For example, the users may be provided with an opportunity to opt in/out of programs or features that may collect the personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (e.g., generalized based on user demographics) rather than associated with a particular user. Finally, the information stored in the user activity log may be deleted after a predetermined period of time.

The attribute determination system 110 may dynamically analyze, determine, and select appropriate visual attributes for content items that are to be presented on client devices 106 at the time the content items are requested for presentation on the client devices 106. Visual attributes of content items may include text formatting, layout, mouse-over effects, position of buttons, position of annotations, and other aspects or characteristics that affect the appearance of the content item. The attribute determination system 110 may dynamically select appropriate visual attributes for a content item at random. The attribute determination system 110 may select visual attributes further based on weights assigned to the attributes, or by analyzing user activity, noting trends and behavior patterns in the user's activity associated with content items previously presented to the user. One or more of the attributes may be different from at least one previous attribute used to present an advertisement to the user previously. The attribute determination system 110 may include parameters, statistics, algorithms, profiles, or mappings that may be applied so as to manage the manner in which visual attributes are analyzed and selected for presentation of content items on client devices 106. The attribute determination system 110 may provide instructions that define the visual attributes for a content item. Examples of such instructions include markup language (e.g., XML, HTML, etc.), scripts, applets, and the like. Although depicted as a separate entity, the attribute determination system 110 can, in some implementations, be part of an advertisement server 108 or a publisher 104.

The client device 106 receives a content item 120 and the instructions that define the attributes for the content item 120. The client device 106 executes the instructions, which causes the client device 106 to render the content item 120 with the attributes for presentation to the user. The content item 120 can be displayed within a publication, such as a page, that includes other content provided by a publisher 104. In some implementations, the publisher 104 can directly provide the content item 120 to the client device 106. For example, when an advertisement is to be included, the publisher 104 can select the advertisement and provide it with the publication.

In some implementations, one or more other components can be used to provide the content item 120. For example, the system 100 may use an advertisement server 108 to provide advertising content items for the publication. To facilitate the provisioning of advertisements, the publisher 104 can forward information to the advertisement server 108. The advertisement server 108 uses the received information to select advertisements according to preprogrammed selection routines. For example, the advertisement server 108 can make a selection in a library of advertisements based on a category of the publisher 104, the content of the publication, one or more keywords, or user profile data. The advertisement server 108 then selects and provides the advertisements for display in the publication.

The attribute determination system 110 may monitor the user's activity with respect to content items. The attribute determination system 110 may analyze the user's activity for trends. For example, the attribute determination system 110 may monitor how the user responds to content items with particular attributes, such as click through rates and conversion rates. The attribute determination system 110 may store information describing the user's activities in a user activity log 114 and may select various attributes for a content item based on user records stored in the user activity log 114.

The user activity log 114 stores identifiers that identify the client devices 106 or the users using the client devices 106, and activity history associated with each of the identifiers. Activity history includes, for example, click through rates, conversion rates, or other interaction for the user associated with content items, visual attributes that were previously used to present the content items to the user, and the like. The user activity log 114 may store other information useful to the selection of visual attributes, such as user profiles and preferences, client device information, including device limitations that would preclude the provisioning of a particular attributes, and publisher or advertiser information. As described above, the data in the activity log 114 are anonymized so as to protect the users' privacy.

One activity that can be monitored by the attribute determination system 110 is a click event. A click event is a user selection of a content item, such as an advertisement, in a publication. In some implementations, when a user selects an advertisement by clicking on it, the browser directs the user to a particular web page associated with the selected advertisement, such as a landing page. Based on the click events, the attribute determination system 110 determines click through rates associated with content items provided with a publication, and also click through rates for content items with particular attributes.

Another activity that can be monitored is a conversion event. A conversion event occurs when a user performs a desired action after being presented with a content item (or a landing page for a selected content item). For example, a conversion event may be a user consummating a purchase, or performing other similar activities such as reviewing information presented by an advertiser, after viewing an advertisement. As another example, a conversion event may be a user redeeming a coupon obtained via presentation of a coupon format advertisement. A conversion event is thus any appropriate measurable or observable user action following a selection of a content item, such as spending a sufficient amount of time viewing a landing page or a web site, selecting one or more links to other documents within the landing page or web site, registering on a web page, subscribing to a newsletter, or downloading software. Based on the conversion events, the attribute determination system 110 may determine conversion rates associated with content items provided with a publication, and also conversion rates for content items with particular attributes.

When using the user's activity history, such as click through rate or conversion rate, or any other appropriate user activity that is monitored to determine attributes for a content item, the attribute determination system 110 may use any suitable statistical measure or technique to select the visual attributes. For example, thresholds, linear combinations with appropriate weighting coefficients, standard or moving (such as one-week, two-week, one-month, two-month, six-month, etc.) averages, or any other appropriate statistical technique may be used.

Figure 2:
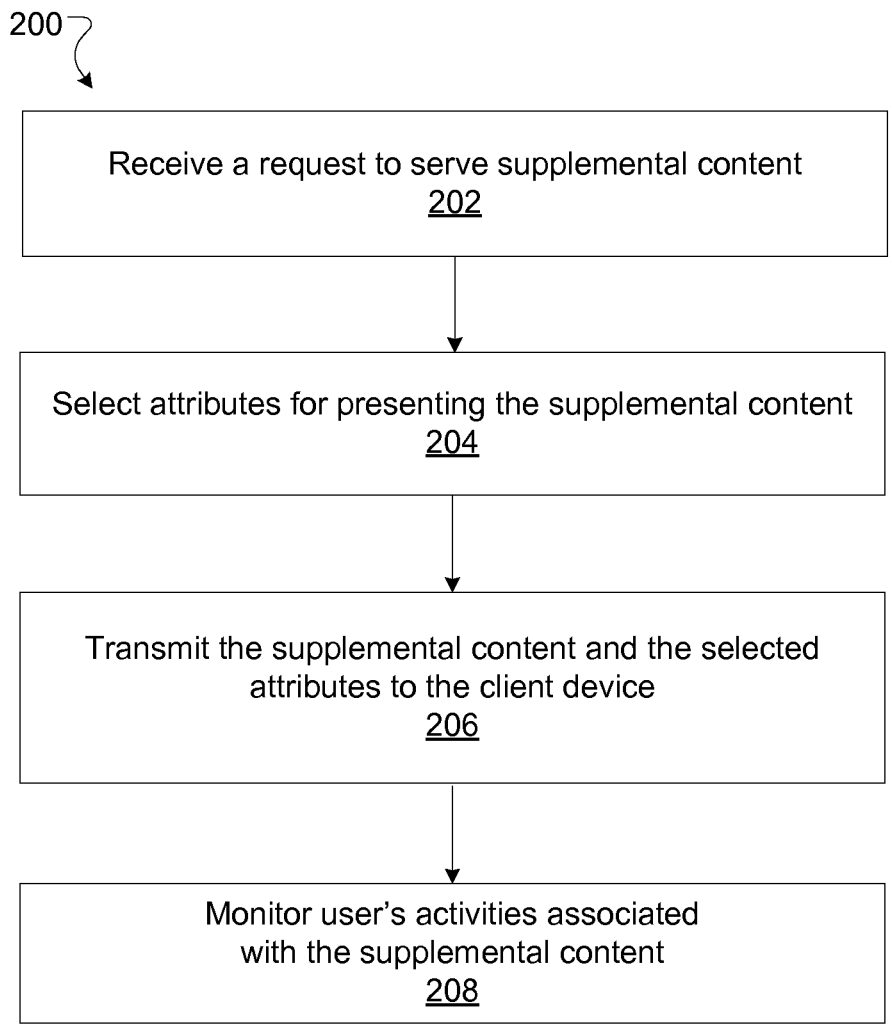
FIG. 2 is a flowchart of an example process for determining visual attributes for a content item.

FIG. 2 is a flowchart of an example process 200 for determining visual attributes for a content item, such as an advertisement. The process 200 may be performed by an attribute determination system that includes one or more computers, such as the attribute determination system 110 of FIG. 1.

The process 200 begins with the attribute determination system receiving a request from a client device, a publisher, or an advertisement server to serve a content item, such as an advertisement or other supplemental content, to be displayed within a publication, such as a web page, requested by a user of the client device (202). In some implementations, the request may include a unique user identifier that identifies the client device that submits the request.

The attribute determination system selects one or more attributes for presenting the advertisement to the user (204). The selected attributes are different from at least one previous attribute used to present content items to the user previously. Attributes of content items may include text formatting, layout, mouse-over effects, position of buttons, position of annotations, and other aspects or characteristics that affect the appearance of the content item. For example, an attribute may define a font color, font size, font style, or font weight. As another example, an attribute may define a layout for the content item.

The selection of attributes can be done by any of a variety of appropriate selection methods. In some implementations, the attribute determination system may select the attributes randomly from a set of possible attributes. The set of possible attributes includes attributes that are different from the previous attributes used to present content items to the user previously.

In other implementations, the attribute determination system may select the attributes randomly and based on a weight assigned to each attribute. For example, statistics and trends associated with the activities of users may show that using certain font styles for text in content items results in above average user interaction with the content items and using other font styles results in below average user interaction with the content items. The attribute determination system may assign weights to the font styles based on how each font style affects user interaction when used to present a content item. The weights correspond to the probability of the font style being selected for presenting the content item to the user.

For example, the attribute determination system may assign weights to fonts that correspond to probabilities of 60% for Arial font, 30% for Verdana font, and 10% for Times font. When randomly selecting a font to use for text in content items, the attribute determination system may randomly select among Arial, Verdana, and Times such that Arial is selected for 60% of the content items presented to the user, Verdana is selected for 30% of the content items presented to the user, and Times is selected for 10% of the content items presented to the user.

In still other implementations, the attribute determination system may use the user identifier to access information describing the user's activities associated with content items previously presented to the user. The attribute determination system may select various attributes for the content item randomly and based on the user's activities.

For example, the attribute determination system may monitor the user's activity with respect to click through rate and conversion rate on content items. If the click through rate or conversion rate is low, the attribute determination system may randomly select the attributes such that all of the attributes are different from the attributes used to present content items to the user previously. If the click through rate or conversion rate is high, the attribute determination system may randomly select attributes such that one of the attributes is different from attributes used to present content items to the user previously.

As another example of selecting attributes randomly and based on the user's activities, the attribute determination system may filter possible attributes based on the user's activities to identify a set of attributes that results in above average user interaction with content items. The attribute determination system may randomly select attributes from the identified set of attributes for presenting content items to the user.

For a publication that includes more than one content item environment, such as advertisement slots, in which content items, such as advertisements, can be presented, the attribute determination system may select different attributes for the content items presented in each content item environment. For example, the content items in one content item environment may have attributes that are different from the attributes used for content items in another content item environment.

The attribute determination system transmits the content item and the selected attributes to the client device for rendering along with the requested publication (206). After providing the content item, the attribute determination system may monitor the user's activity associated with the content item (208). For example, the attribute determination system may receive reporting data that describes actions taken by the user with respect to the content item. The attribute determination system may analyze the user's activity for trends. Based on the trends, the attribute determination system may assign weights to various attributes or may determine how aggressively to vary the attributes for content items that are requested by the user. The attribute determination system may store information associated with the user's activities.

FIGS. 3-6 are example content items, e.g., advertisements, where at least one attribute in a content item is different from an attribute of another content item. A content item, e.g., content item 320 in FIG. 3, may include a title 321, body text 322, a uniform resource locator (URL) 323, one or more buttons 324, or an annotation 325. A content item may include one or more components for different tags or indicators (e.g., HTML tags, or XHTML, cHTML, or WML format components). The components may be used to determine how to display the content item.

The attribute determination system may vary the attributes of content items by changing the text formatting, text color, layout, mouse-over effects, position of buttons, position of annotations, and other aspects or characteristics that affect the appearance of the content item. The attribute determination system may provide each of the content items shown in FIGS. 3-6 with different attributes for presentation to the user.

Figure 3:
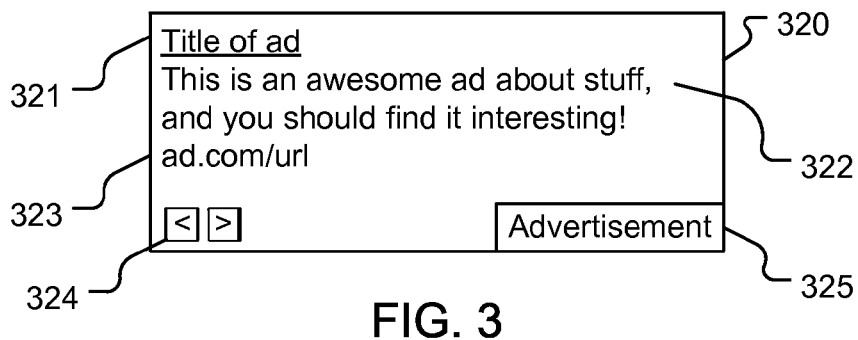
FIGS. 3-6 are example content items where at least one attribute in a content item is different from an attribute of another content item.
Figure 4:
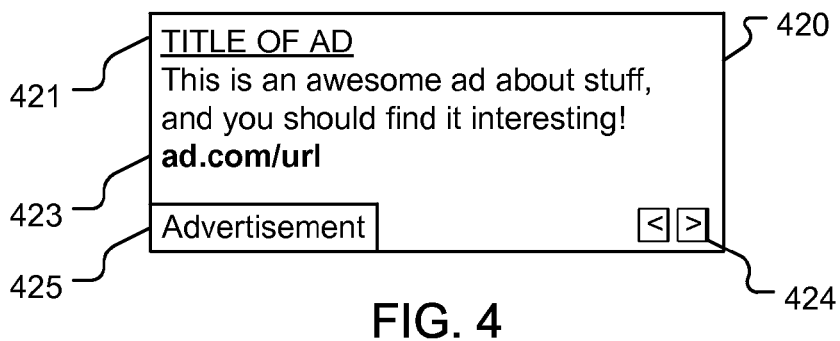

FIG. 3 is a first content item 320 presented to a user. FIG. 4 is a second content item 420 presented to the user. The attribute determination system varies the capitalization of the titles 321 and 421, the bold face of the URLs 323 and 423, the position of the buttons 324 and 424, and the position of the annotations 325 and 425 between content items 320 and 420.

Figure 5:
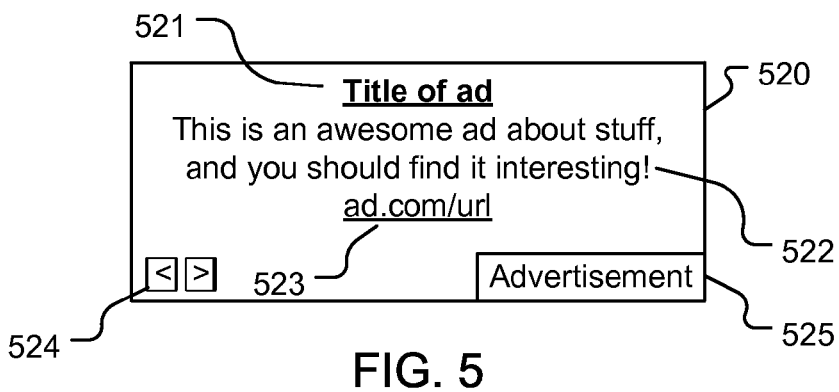

FIG. 5 is a third content item 520 presented to the user. Between content items 420 and 520, the attribute determination system varies the justification (e.g., from left to center) of the text in the content items 420 and 520, the capitalization of the titles 421 and 521, the bold face of the titles 421 and 521, the bold face and underline of the URLS 423 and 523, the position of the buttons 424 and 525, and the position of the annotations 425 and 525.

Figure 6:
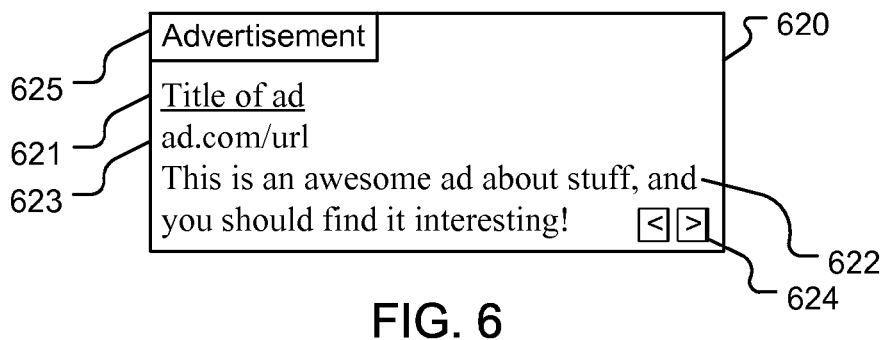

FIG. 6 is a fourth content item 620 presented to the user. Between content items 520 and 620, the attribute determination system varies the justification (e.g., from center to left), the font style (e.g., from Arial to Times), and layout (e.g., the positions of the URLS 523 and 623 and the body text 522 and 622 are changed) of the text in the content items 420 and 520, the bold face of the titles 521 and 621, the underline of the URLS 523 and 623, the position of the buttons 524 and 624, and the position of the annotations 525 and 625.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
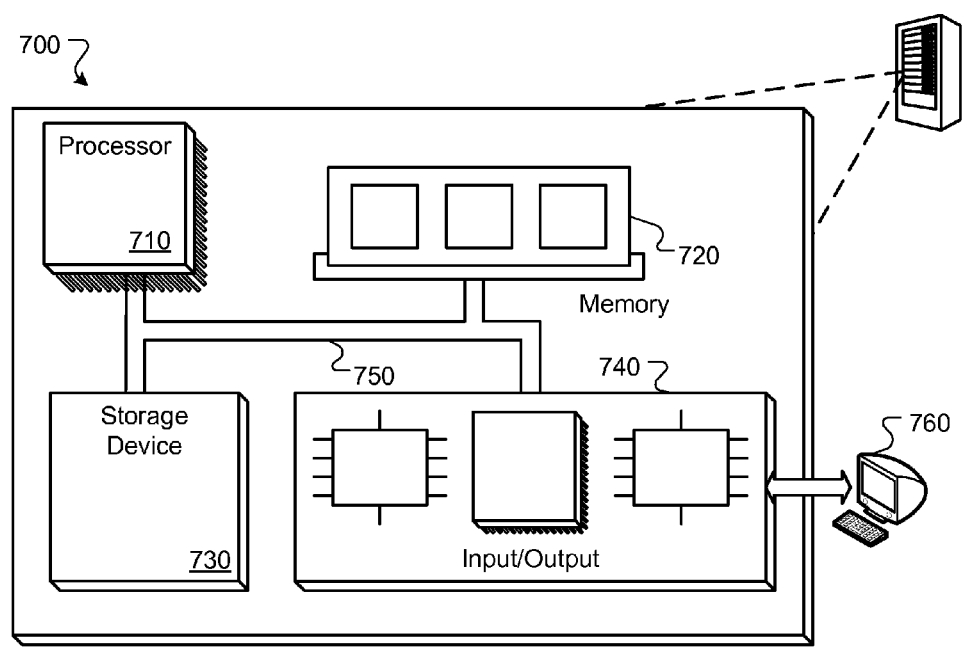
FIG. 7 is a block diagram of a programmable processing system.

An example of one such type of computer is shown in FIG. 7, which shows a block diagram of a programmable processing system (system). The system 700 that can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more processors through a network, a request to serve a given portion of supplemental content to be presented with a web page requested by a user of a client system having a browser, wherein the request includes a user identifier from a cookie stored at the client system that identifies the user of the client system;
   identifying, by the one or more processors, one or more previous visual attributes that were previously varied in one or more items of supplemental content previously provided to the user, including identifying the previous visual attributes that are associated with the user identifier included in the request;
   analyzing, by the one or more processors, actions of the user associated the one or more items of supplemental content that were presented to the user previously using the one or more previous visual attributes;
   dynamically selecting, after receiving the request by the one or more processors, one or more visual attributes from a plurality of attributes for presenting the given portion of supplemental content to the user such that the selected one or more visual attributes are different than at least one previous visual attribute of the identified one or more previous visual attributes used to present the one or more items of supplemental content to the user previously based on the analysis of the actions of the user;
   dynamically modifying, after receiving the request by the one or more processors, the given portion of supplemental content to include the selected one or more visual attributes, thereby creating a modified visualization of the given portion of supplemental content; and
   transmitting, by the one or more processors through the network, the modified visualization of the given portion of supplemental content to the client system integrated into a presentation of the requested web page within the browser.

2. The method of claim 1, wherein the supplemental content comprises an advertisement.

3. The method of claim 1, wherein the selected one or more visual attributes defines one or more of a font color, a font size, a font style, a font weight, a layout of the supplemental content, a position of a button, a mouse-over effect, or a position of annotations.

4. The method of claim 1, wherein the selecting one or more visual attributes from a plurality of attributes for presenting the supplemental content to the user comprises:
   assigning a weight to each visual attribute of the plurality of attributes; and
   selecting the one or more visual attributes randomly from the plurality of attributes based on the weight assigned to each visual attribute.

5. The method of claim 1, wherein the dynamically selecting one or more visual attributes from a plurality of attributes for presenting the given portion of supplemental content to the user comprises:
   identifying a set of attributes from the plurality of attributes based on the analyzed actions of the user, the set of attributes being associated with higher rates of interaction with items of supplemental content relative to other attributes of the plurality of attributes; and
   selecting the one or more visual attributes randomly from the identified set of attributes.

6. A non-transitory computer-readable storage medium encoded with instructions that when executed by a data processing device cause the data processing device to perform operations comprising:
   receiving, through a network, a request to serve a given portion of supplemental content to be presented with a web page requested by a user of a client system having a browser, wherein the request includes a user identifier from a cookie stored at the client system that identifies the user of the client system;
   identifying one or more previous visual attributes that were previously varied in one or more items of supplemental content previously provided to the user, including identifying the previous visual attributes that are associated with the user identifier included in the request;
   analyzing, by the one or more processors, actions of the user associated with one or more items of supplemental content that were presented to the user previously using the one or more previous visual attributes;
   dynamically selecting, after receiving the request, one or more visual attributes from a plurality of attributes for presenting the given portion of supplemental content to the user such that the selected one or more visual attributes are different than at least one previous visual attribute of the identified one or more previous visual attributes used to present the one or more items of supplemental content to the user previously based on the analysis of the actions of the user;
   dynamically modifying, after receiving the request, the given portion of supplemental content to include the selected one or more visual attributes, thereby creating a modified visualization of the given portion of supplemental content and
   transmitting, by the one or more processors through the network, the modified visualization of the given portion of supplemental content to the client system integrated into a presentation of the requested web page within the browser.

7. The non-transitory computer-readable storage medium of claim 6, wherein the supplemental content comprises an advertisement.

8. The non-transitory computer-readable storage medium of claim 6, wherein the selected one or more visual attributes defines one or more of a font color, a font size, a font style, a font weight, a layout of the supplemental content, a position of a button, a mouse- over effect, or a position of annotations.

9. The non-transitory computer-readable storage medium of claim 6, wherein the dynamically selecting one or more visual attributes from a plurality of attributes for presenting the given portion of supplemental content to the user comprises:
   assigning a weight to each visual attribute of the plurality of attributes; and
   selecting the one or more visual attributes randomly from the plurality of attributes based on the weight assigned to each visual attribute.

10. The non-transitory computer-readable storage medium of claim 6, wherein the dynamically selecting one or more visual attributes from a plurality of attributes for presenting the given portion of supplemental content to the user comprises:
    identifying a set of attributes from the plurality of attributes based on the analyzed actions of the user, the set of attributes being associated with higher rates of interaction with items of supplemental content relative to other attributes of the plurality of attributes; and selecting the one or more visual attributes randomly from the identified set of attributes.

11. A system, comprising:

a data processing apparatus; and a non-transitory computer-readable storage medium encoded with instructions that when executed by the data processing apparatus cause the data processing apparatus to perform operations comprising:

receiving, through a network, a request to serve a given portion of supplemental content to be presented with a web page requested by a user of a client system having a browser, wherein the request includes a user identifier from a cookie stored at the client system that identifies the user of the client system;

identifying one or more previous visual attributes that were previously varied in one or more items of supplemental content previously provided to the user, including identifying the previous visual attributes that are associated with the user identifier included in the request;

analyzing, by the one or more processors, actions of the user associated with one or more items of supplemental content that were presented to the user previously using the one or more previous visual attributes;

dynamically selecting, after receiving the request, one or more visual attributes from a plurality of attributes for presenting the given portion of supplemental content to the user such that the selected one or more visual attributes are different than at least one previous visual attribute of the identified one or more previous visual attributes used to present the one or more items of supplemental content to the user previously based on the analysis of the actions of the user;

dynamically modifying, after receiving the request, the given portion of supplemental content to include the selected one or more visual attributes, thereby creating a modified visualization of the given portion of supplemental content; and transmitting, through the network, the modified visualization of the given portion of supplemental content to the client system integrated into a presentation of the requested web page within the browser.

12. The system of claim 11, wherein the supplemental content comprises an advertisement.

13. The system of claim 11, wherein the dynamically selecting one or more visual attributes from a plurality of attributes for presenting the given portion of supplemental content to the user comprises:

assigning a weight to each visual attribute of the plurality of attributes; and selecting the one or more visual attributes randomly from the plurality of attributes based on the weight assigned to each visual attribute.

14. The system of claim 11, wherein the dynamically selecting one or more visual attributes from a plurality of attributes for presenting the given portion of supplemental content to the user comprises:

identifying a set of attributes from the plurality of attributes based on the analyzed actions of the user, the set of attributes being associated with higher rates of interaction with items of supplemental content relative to other attributes of the plurality of attributes; and selecting the one or more visual attributes randomly from the identified set of attributes.

15. The method of claim 1, wherein the transmitting the modified visualization of the given portion of supplemental content to the client system for presentation along with the requested page comprises:

transmitting instructions that define the selected one or more visual attributes for execution at the client system causing the client system to render the supplemental content with the selected one or more visual attributes, wherein the instructions comprises at least one of a markup language tag, a script, or an applet.

16. The method of claim 1, further comprising:

determining a number of visual attributes to select from the plurality of attributes based on a rate of interaction with items of supplemental content that were presented to the user previously; and selecting the one or more visual attributes randomly from the plurality of attributes based on the determined number of attributes.

17. The system of claim 11, wherein the transmitting the given portion of supplemental content to the client system for presentation along with the requested page comprises:

transmitting instructions that define the selected one or more visual attributes for execution at the client system causing the client system to render the supplemental content with the selected one or more visual attributes, wherein the instructions comprises at least one of a markup language tag, a script, or an applet.

18. The system of claim 11, wherein the operations further comprise:

determining a number of visual attributes to select from the plurality of attributes based on a rate of interaction with items of supplemental content that were presented to the user previously; and selecting the one or more visual attributes randomly from the plurality of attributes based on the determined number of attributes.

* * * * *